US012378016B2

(12) United States Patent
Divyajit et al.

(10) Patent No.: US 12,378,016 B2
(45) Date of Patent: Aug. 5, 2025

(54) QUICK RELEASE DEVICE

(71) Applicant: IDEAFORGE TECHNOLOGY PVT. LTD., Navi Mumbai (IN)

(72) Inventors: Piyush Divyajit, Navi Mumbai (IN); Shubhankar Gokhale, Navi Mumbai (IN)

(73) Assignee: IDEAFORGE TECHNOLOGY PVT. LTD., Navi Mumbai (IN)

( * ) Notice: Subject to any disclaimer, the term of this patent is extended or adjusted under 35 U.S.C. 154(b) by 0 days.

(21) Appl. No.: 18/436,874

(22) Filed: Feb. 8, 2024

(65) Prior Publication Data

US 2024/0270416 A1  Aug. 15, 2024

(30) Foreign Application Priority Data

Feb. 9, 2023  (IN) .............................. 202321008537

(51) Int. Cl.
*B64U 60/30*  (2023.01)
*B64U 60/50*  (2023.01)

(52) U.S. Cl.
CPC ............. *B64U 60/30* (2023.01); *B64U 60/50* (2023.01)

(58) Field of Classification Search
CPC ................................ B64U 60/30; B64U 60/50
See application file for complete search history.

(56) References Cited

U.S. PATENT DOCUMENTS

| 2012/0034812 A1* | 2/2012 | Tanaka ............. H01R 13/62938 439/372 |
| 2018/0111685 A1* | 4/2018 | Tian ........................ B64C 25/52 |
| 2023/0294852 A1* | 9/2023 | Maeda ................... B64U 60/50 244/102 R |

FOREIGN PATENT DOCUMENTS

| EP | 1132258 A1 * | 9/2001 | ............. B60R 11/02 |
| WO | WO-2019112405 A1 * | 6/2019 | |

* cited by examiner

*Primary Examiner* — Christopher P Ellis
(74) *Attorney, Agent, or Firm* — Workman Nydegger

(57) ABSTRACT

A quick release device 100 for releasably coupling a pair of landing gears in a UAV includes a housing 400 having two slots 102 for receiving landing gears to be locked and released, and two snap levers 200 pivotally mounted in the housing 400 for movement between a lock position and a release position. The snap levers 200 include a locking feature 104 to engage with a corresponding feature on the landing gears to lock them with the housing 400. Snap levers 200 are located such that the two snap levers can be moved together by a single thumb or finger to the released positions. A sheet shaped planar biasing device 300 for biasing snap levers 200 towards the locked position is provided, which includes two generally U-shaped cut-outs defining cantilever springs in contact with the snap levers 200.

15 Claims, 5 Drawing Sheets

QUICK RELEASE DEVICE

TECHNICAL FIELD

The present disclosure generally relates to the field of Unmanned Aerial Vehicles (UAVs). In particular, the present disclosure relates to a quick release device which enables quick installation and release of parts of a UAV, for example a landing gear of the UAV.

BACKGROUND

Background description includes information that may be useful in understanding the present disclosure. It is not an admission that any of the information provided herein is prior art or relevant to the presently claimed disclosure, or that any publication specifically or implicitly referenced is prior art.

Unmanned Aerial Vehicles are used for a variety of applications such as security, logistics, data collection and film making. During execution of these roles, the UAVs may have to be transported from one place to other. Therefore, Many UAVs are designed to be dismentalable to reduce their volume and make packaging easy. Need for disassembly and assembly of parts, in the field, can also arise due to need to change parts to meet specific requirement. For example, the UAVs have to land on unpredictable and harsh surface for a variety of reasons, such as running out of battery, or lack of proper landing surface, and to accommodate the variety of circumstances in which unmanned aerial vehicles fly, modular designs have been proposed that allow choice of correct part suited to given circumstances, or to allow replacement of a damaged part.

However, dismantling and assembling the UAV can be time consuming. To reduce the assembly and disassembly time, it would be advantageous if the coupling means for coupling different parts, such as landing gears, can be quick lock and release type.

There is therefore a need in the art to provide a quick lock and release mechanism for assembling and disassembling parts, such as landing gears, of UAVs.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

OBJECTS OF THE INVENTION

A general object of the present invention is to provide a quick release device for ease of assembly and disassembly of parts of an unmanned aerial vehicle.

An object of the present invention is to provide a quick release device that is compact and lightweight.

Another object of the present invention is to provide a quick release device that is easy and quick to operate.

Another object of the present invention is to provide a biasing device for the quick release device that enables a compact and easy to assemble configuration of the quick release device.

SUMMARY OF THE INVENTION

Aspects of the present disclosure relate to a quick release device for releasably coupling a pair of members, such as a pair of landing gears of an UAV, to a housing. In an aspect, the disclosed quick release device is a snap mechanism as described in this disclosure.

In an aspect, the proposed quick release device for releasably coupling a pair of members includes a housing that includes a pair of slots for receiving the pair of members to be locked and released, and a pair of snap levers pivotally mounted in the housing for movement between a lock position and a release position. Each of the two snap levers includes a locking feature to engage with a corresponding feature provided on the pair of members, after the members are inserted through the corresponding slots, thereby locking the members with the housing. The device further includes a biasing device for biasing the snap levers towards the locked position. In an aspect, the two snap levers are located such that the two snap levers can be moved together by a single thumb or finger to the released positions.

In an embodiment, the biasing device can be a planar sheet placed on an upper face of the housing such that the snap levers are in contact with the sheet.

In an embodiment, the biasing device comprises a pair of suitably shaped cut-outs that define a pair of cantilevers that function as leaf springs. There can be two cut-outs defining two cantilevers, one for each of the two snap levers to bias the respective snap lever towards the locked position. In a preferred embodiment, the cut-outs can be generally U-shaped.

In an embodiment, the biasing device may be made from any one or a combination of carbon fibre and carbon steel.

In an embodiment, the two snap levers may be identical in shape, and can have a stepped design with a full width portion and a reduced width portion.

In an embodiment, the full width portion and the reduced width portion may be configured such that the snap levers, when placed opposite and adjacent to each other, fit together to occupy a space of generally rectangular shape, and the housing may include a rectangular recess to accommodate the opposite and adjacently placed snap levers.

In an embodiment, each of the snap levers may include a lateral through hole configured to receive a pivot pin to pivot the snap lever to the housing.

In an embodiment, each of the snap levers may include a laterally disposed through elongated hole located in the reduced width portion. The elongated hole may be elongated in an axial direction of the snap levers and may be configured to receive a snap levers coupling pin to couple the two snap levers to each other. The coupling of the snap levers by the snap leavers coupling pin through the elongated hole constrains the snap levers to move together.

In an embodiment, the engaging feature on the snap levers may be a protrusion in lower part of the full width portion, and the corresponding engaging feature in the members can be a corresponding cavity in the members.

In an embodiment, the housing may include an upper housing and a lower plate configured to be fixed to a lower surface of the upper housing and the biasing device may be fixed to an upper surface of the upper housing. The upper housing may include a pair of recesses at longitudinal end sides. The recesses, when the lower plate is fixed to the upper housing, function as the slots for receiving the members.

In an embodiment, the upper housing may include a set of pin slots provided on the lower surface to accommodate the pivot pins. The lower plate may include a set of locating lugs such that, when the lower plate is fixed to the lower surface of the upper housing, the locating lugs are received in the pin slots to retain the pivot pins as well as to locate position of the lower plate relative to the upper housing.

In an embodiment, the members may be a pair of landing gear of a UAV, and the housing is fixed to a fuselage of the UAV.

Another aspect of the present disclosure relates to a biasing device for biasing a pair of snap levers of a quick release device for releasably coupling a pair of members, The biasing device comprises a planar sheet configured to be placed on an upper face of a housing of the quick release device, the biasing device includes a pair of U shaped cut-outs that define a pair of cantilevers that function as leaf springs, one for each of the snap levers that are pivotally fixed to the housing for movement between a lock position and a release position, such that the snap levers are in contacted with the leaf springs to bias the snap levers towards the locked position of the snap levers.

In an embodiment, the sheet may be made from any one or a combination of carbon fibre and carbon steel.

In an embodiment, the two snap levers are located such that the two snap levers can be moved together by a single thumb or finger to the released positions Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DETAILED DESCRIPTION

Figure 1A:
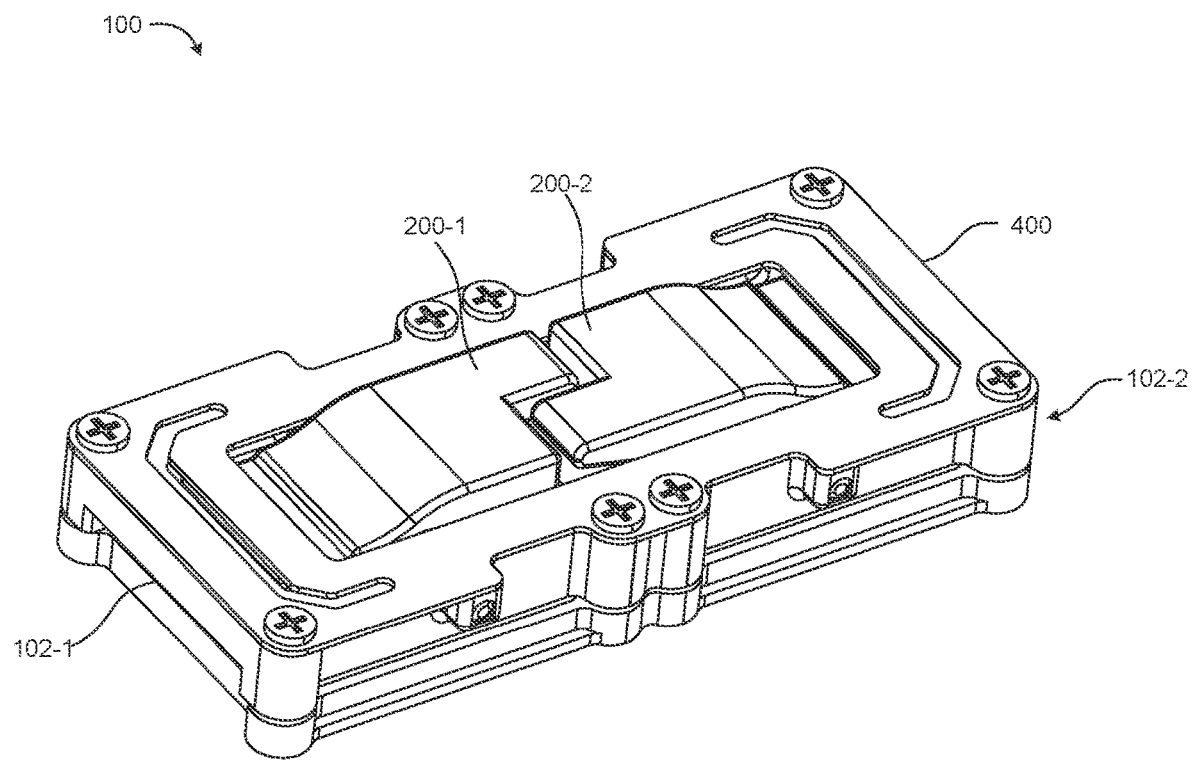
FIG. 1A illustrates an exemplary perspective view of the disclosed quick release device for releasably coupling a pair of members, in accordance with embodiments of the present disclosure.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims.

Various terms are used herein. To the extent a term used in a claim is not defined, it should be given the broadest definition persons in the pertinent art have given that term as reflected in printed publications and issued patents at the time of filing.

It should be noted that the term "coupled" as used herein implies a mechanical connection between two parts, using a means to connect them together, such as a pin.

Embodiments explained herein relate to a quick release device for use in unmanned aerial vehicles that uses a coupled pair of snap levers that can move together between a lock position and a release position. In an aspect, coupling of the snap levers results in the to snap levers moving together, whenever any one of the two snap lever moves from the locked position to unlocked position or from unlock position to the locked position. This helps in single hand actuation of the quick release mechanism, keeping the other hand free for positioning of the members being coupled to the device and in turn to a fuselage of the UAV to which the quick release mechanism may be fixed.

In another aspect, a biasing device for the quick release mechanism is disclosed that biases the snap levers of the quick release mechanism towards the locked position. The biasing device is made of a planar sheet configured to be placed on an upper face of a housing of the quick release device. The biasing device includes a pair of U shaped cut-outs that define a pair of cantilevers that function as leaf springs, one for each of the snap levers that are pivotally fixed to the housing for movement between a lock position and a release position, such that the snap levers are in contacted with the leaf springs to bias the snap levers towards the locked position of the snap levers, whenever the snap levers move towards the unlock position. The biasing device with a planar configuration that can be fixed to a surface of a housing of the quick release device enables an easy to assemble and compact configuration of the quick release device.

Figure 1B:
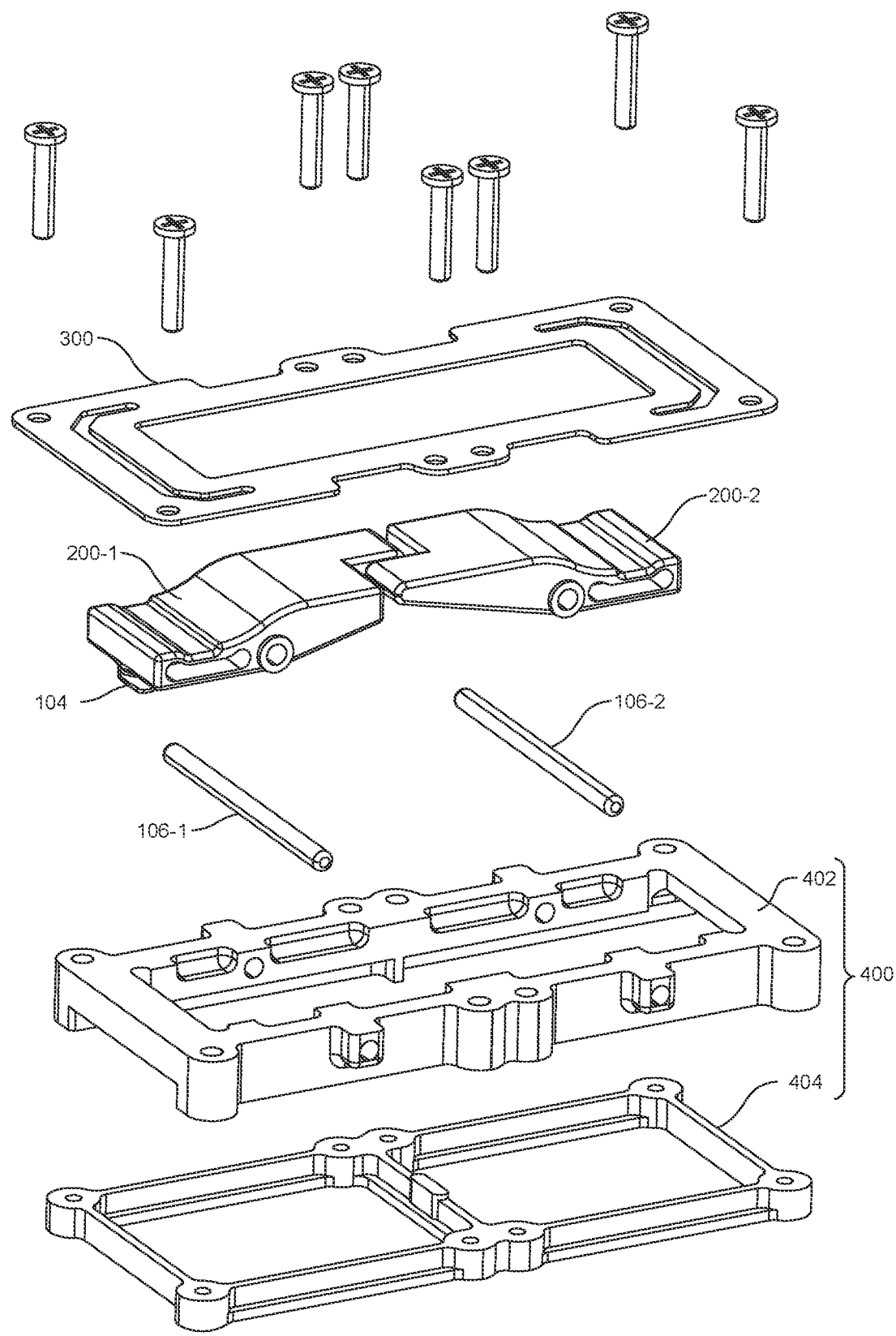
FIG. 1B illustrates an exemplary exploded view of the device of FIG. 1A, showing main parts of the quick release device, in accordance with embodiments of the present disclosure.

Referring to FIGS. 1A and 1B, where perspective view and an exploded view respectively of the disclosed quick release device is disclosed. The quick release device 100 can include a housing 400 and a pair of snap levers, such as snap levers 200-1 and 200-2 (Individually/collectively referred to as snap lever(s) 200, hereinafter), which are pivotally fixed to the housing 400. The housing 400 includes a pair of slots, such as slots 102-1 and 102-2 ((individually/collectively referred to as slot(s) 102, hereinafter) for insertion of members, such a landing gears 602-1 and 602-2 ((Individually/collectively referred to as landing gear(s) 602, hereinafter), as shown in FIGS. 6A and 6B, to be coupled to the device 100. On being inserted in the slots 102, the landing gears 602 can engage with the corresponding snap levers 200, though locking features provided on the snap levers 200 and the landing gears 602, to be retained in the coupled position. The device 100 itself can be fixed to a fuselage 502 (refer to FIG. 5) of an UAV, thus coupling the landing gears 602 to the fuselage 502.

In an aspect, the two snap levers 200 can be coupled to each other such that whenever any one of the two snap levers 200 moves from the locked position to unlocked position or from unlock position to the locked position, the other snap lever 200 too moves to the corresponding position, This helps in single hand actuation of the quick release mechanism, keeping the other hand free for positioning of the members being coupled to the device and in turn to a fuselage of the UAV to which the quick release mechanism may be fixed.

Also shown in FIG. 1B are other parts of the quick release device 100, such as a biasing device 300 that biases the snap levers 200 towards the clocked position. Thus, when the landing gears 602 are inserted into the slots 102, the corresponding snap levers 200 can move from the locked position towards the unlock position to allow the landing gears 602 to be inserted, and when the locking features on the snap lever 200 and the landing gears 602 are appropriately positioned, the biasing device 300 can cause the snap lever 200 to move to the locked position and lock the landing gear 602 in position by engagement of the locking features. When the landing gears are to be dismantled from the fuselage 502, a user can press at the center of the snap mechanism, with one hand using his thumb/finger, to move both the snap levers 200 to the unlock position, and use the other hand to pull out the landing gears 602 one by one.

FIG. 1B also shows the locking feature of the snap lever 200, which can be a protrusion, such as protrusion 104 (also referred to as locking feature 104, herein) on a face of the locking levers 200 that faces the slot 102. The corresponding locking feature on the landing gear 602 can be a matching cavity, such as cavities 604-1 and 604-2 (individually and collectively referred to as cavity(s) 604 or corresponding locking feature 604, herein), as shown in FIG. 6A.

FIG. 1B further shows pivot pins, such as pivot pins 106-1 and 106-2 (Individually/collectively referred to as pivot pin(s) 106, herein) that, at the two ends, are supported by the housing 400 and inserted through a hole 204 (refer to FIG. 2) in the snap levers 200 to pivotal coupling of the snap levers 200 with the housing 400.

Figure 4:
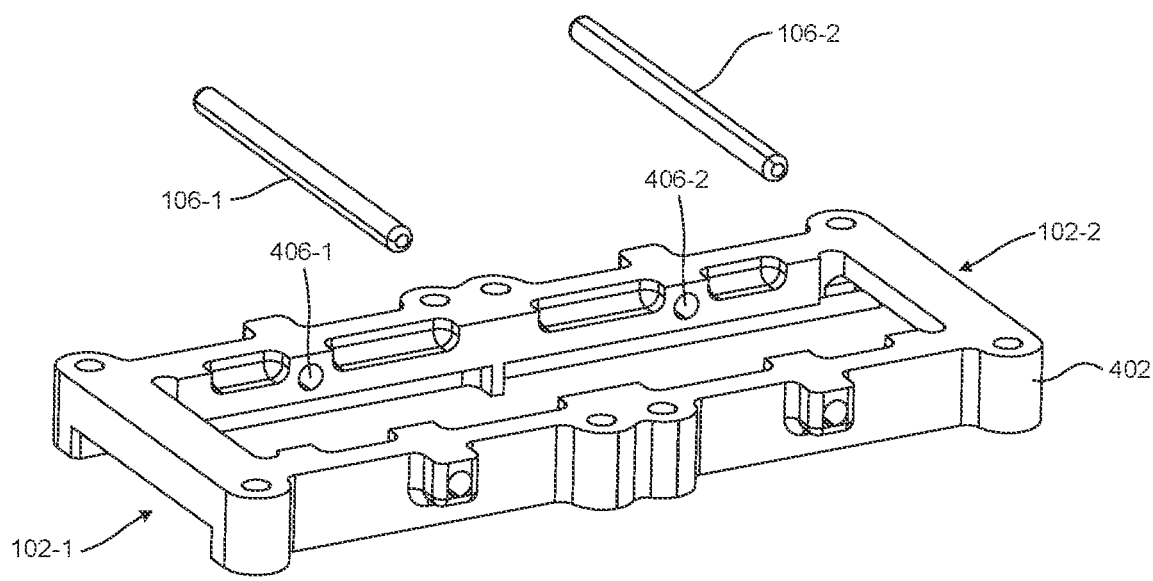
FIG. 4 illustrates an exemplary perspective view of the upper housing of the quick release device of FIGS. 1A and 1B, in accordance with embodiments of the present disclosure.

FIGS. 1B and 4 show details of the housing 400. The housing 400 can include an upper housing 402 and a lower plate 404. The lower plate 404 can be configured to be fixed to a lower surface of the upper housing 402. The biasing device 300 can be fixed to an upper surface of the upper housing 402. The upper housing 402 can be configured to accommodate the snap levers 200 within a rectangular opening provided in the upper housing 402. The upper housing 402 can also include a pair of recesses on the lower surface at longitudinal end sides such that, when the lower plate 404 is fixed to the upper housing 402, the recesses function as the slots 102 for receiving the landing gears 602.

Figure 2:
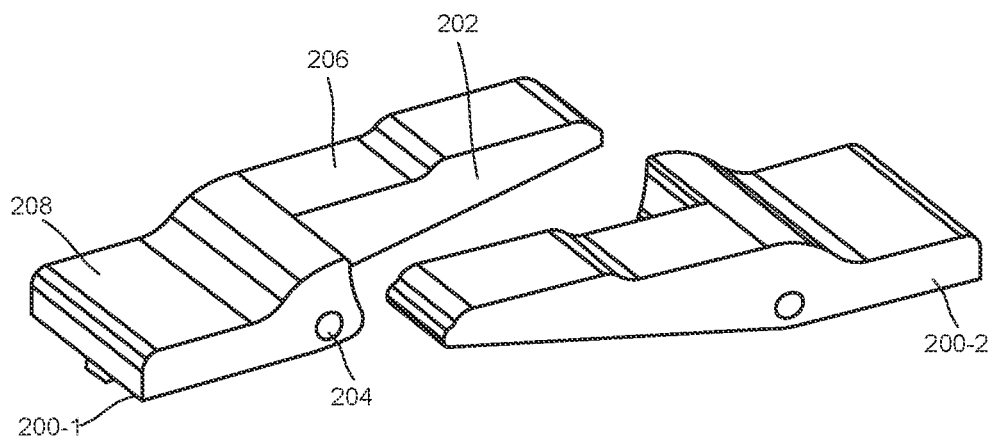
FIG. 2 illustrates an exemplary perspective view of a pair of snap levers of the quick release device of FIGS. 1A and 1B, in accordance with embodiments of the present disclosure.

FIG. 2 shows details of the snap levers 200. In an embodiment, as shown therein, the two snap levers 200 can be identical in shape, and can have a stepped design with a full width portion 208 and a reduced width portion 206. The full width portion 208 and the reduced width portion 206 can be configured such that the snap levers 200, when placed opposite and adjacent to each other, fit together to form a generally rectangular shape for accommodation with in the rectangular opening in the upper housing 402. Also, when the snap levers 200 are placed opposite and adjacent to each other, the reduced width portions 206 of the two snap levers 200 are placed adjacent to each other such that both the reduced width portions 206 can be pressed by a single thumb/finger to move the two snap levers 200 towards the unlock position.

Further, as shown, each snap lever 200 can include a lateral through hole 204 to receive the pivot pin 106.

Figure 3:
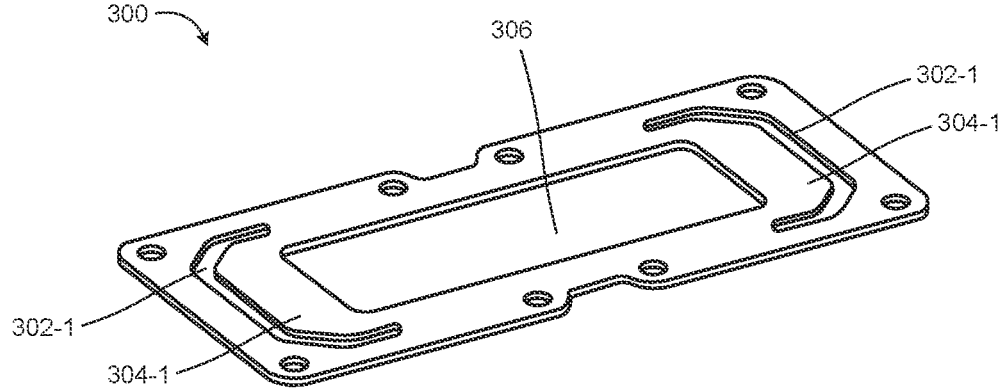
FIG. 3 illustrates an exemplary perspective view of the biasing device of the quick release device of FIGS. 1A and 1B, in accordance with embodiments of the present disclosure.

FIG. 3 shows details of the biasing device 300 of the quick release device 100. As shown therein, the biasing device 300 can be a planar sheet placed on an upper face of the housing 400 such that the full width portion 208 of the snap levers 200 is in contact with the sheet. The biasing device 300 can include a pair of suitably shaped cut-outs, such as U-shaped cut-out 302-1 and 302-2 (individually/collectively referred to as cut-out 302, herein) that define a pair of cantilevers that function as leaf springs, one for each of the two snap levers 200 to bias the respective snap lever 200 towards the locked position.

In an embodiment, the biasing device 300 may be made from any one or a combination of carbon fibre and carbon steel.

FIG. 4 shows details of the upper housing 402 having set of holes 406-1 and 406-2 for receiving the pins 106 that support the snap levers 200 through the respective holes 204. The upper housing 402 also includes cut-outs that function as slots 102 when the upper housing 402 is assembled with the lower plate 404, as shown in FIG. 1A.

Figure 5:
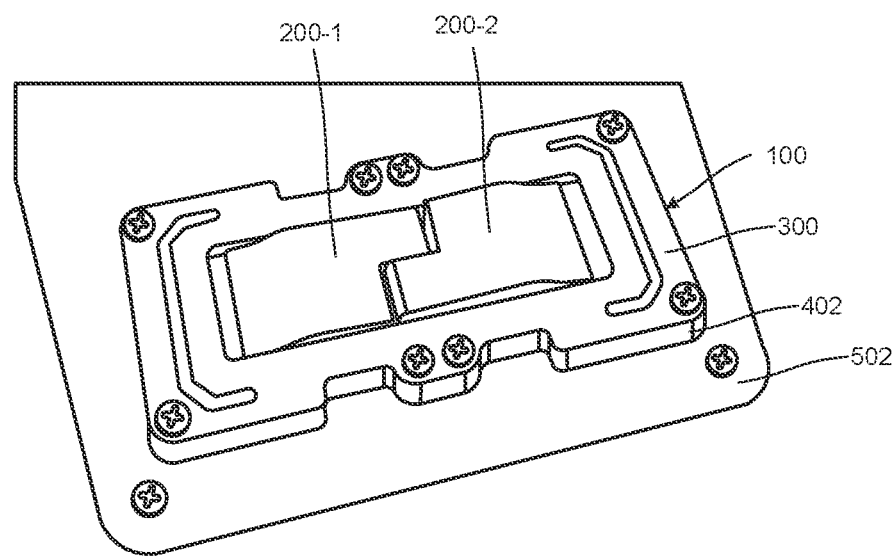
FIG. 5 illustrates an exemplary perspective view of the quick release device of FIGS. 1A and 1B fixed to a fuselage of UAV, in accordance with embodiments of the present disclosure.
Figure 6A:
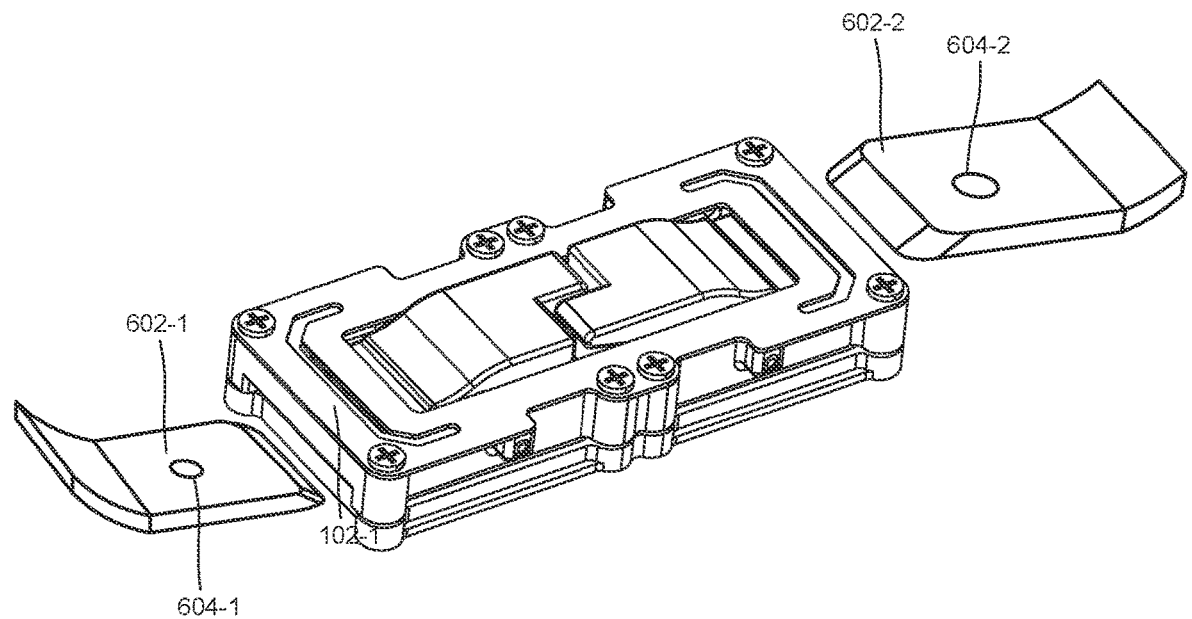
FIGS. 6A and 6B respectively illustrate a pair of landing gears being coupled to the quick release device through the slots in the quick release device, and the landing gears fixed to the quick release device in engagement with the snap levers, in accordance with embodiments of the present disclosure.
Figure 6B:
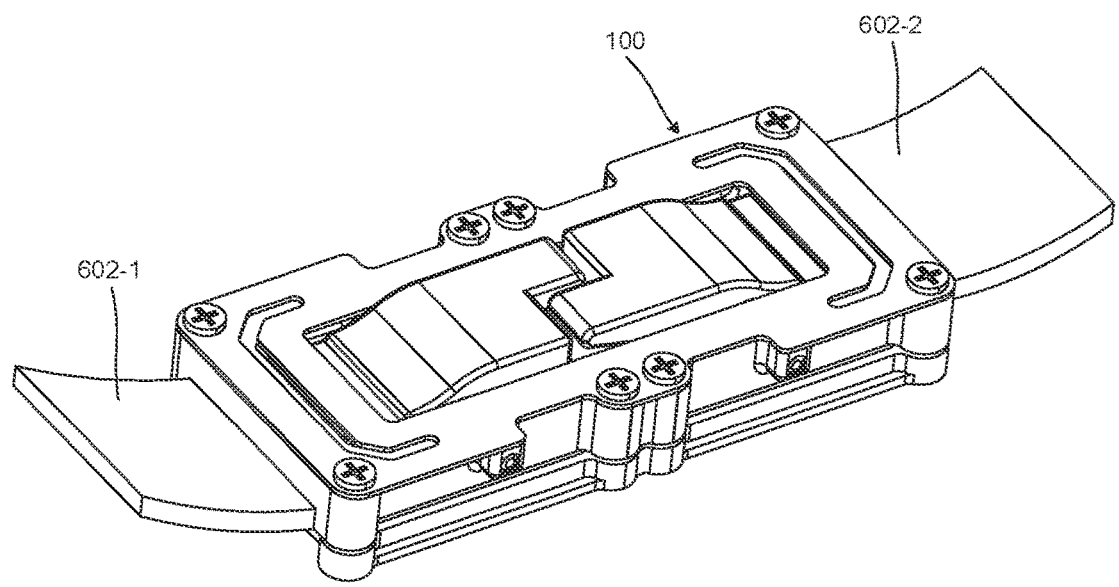

FIG. 5 shows the quick release device 100 fixed to a fuselage 502. The fixing of the quick release device 100 to fuselage 502 helps the landing gears 602 to be fixed to the fuselage 502, when the landing gears 602 are inserted through the slots 102 of the quick release device 100 and get locked thereto. The quick release device 100 can be fixed to the fuselage 502 by screws through a plurality of holes provided in the quick release device 100.

FIGS. 6A and 6B respectively show a pair of landing gears 602 being coupled to the quick release device 100 through the slots 102 in the quick release device 100, and the landing gears 602 fixed to the quick release device 100 in engagement with the snap levers 200.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

Advantages of the Invention

The present disclosure provides a quick release device for ease of assembly and disassembly of parts of an unmanned aerial vehicle.

The present disclosure provides a quick release device that is compact and lightweight.

The present disclosure provides a quick release device that is easy and quick to operate.

The present disclosure provides a biasing device for the quick release device that enables a compact and easy to assemble configuration of the quick release device.

We claim:

1. A quick release device for releasably coupling a pair of members, the device comprising:
   a housing, the housing comprising a pair of slots for receiving the pair of members to be locked and released;
   a pair of snap levers pivotally mounted in the housing for movement between a lock position and a release position; each of the two snap levers comprising a locking feature to engage with a corresponding feature provided on the pair of members, after the members are inserted through the corresponding slots, thereby locking the members with the housing;
   a biasing device for biasing the snap levers towards the locked position;
   wherein the two snap levers are located such that the two snap levers can be moved together by a single thumb or finger to the released positions.

2. The device claimed in claim 1, wherein the biasing device is a planar sheet placed on an upper face of the housing such that the snap levers are in contact with the sheet.

3. The device claimed in claim 2, wherein the biasing device comprises a pair of U shaped cut-outs that define a pair of cantilevers that function as leaf springs, one for each of the snap levers to bias the respective snap levers towards the locked position.

4. The device claimed in claim 2, wherein the biasing device is made from any one or a combination of carbon fibre and carbon steel.

5. The device claimed in claim 1, wherein the two snap levers are identical in shape, having a stepped design with a full width portion and a reduced width portion.

6. The device claimed in claim 5, wherein the full width portion and the reduced width portion is configured such that the snap levers, when placed opposite and adjacent to each other, fit together to occupy a space of generally rectangular shape, and wherein the housing comprises a rectangular recess to accommodate the opposite and adjacently placed snap levers.

7. The device claimed in claim 1, wherein each of the snap levers comprises a lateral through hole configured to receive a pivot pin to pivot the snap lever to the housing.

8. The device claimed in claim 5, wherein each of the snap levers comprises a laterally disposed through elongated hole located in the reduced width portion, the elongated hole being elongated in an axial direction of the snap lever and configured to receive a snap levers coupling pin to couple the two snap levers to each other, which coupling constrains the snap levers to move together.

9. The device claimed in claim 5, wherein each of the snap levers comprises a protrusion in lower part of the full width portion, to engage with a corresponding cavity in the members.

10. The device as claimed in claim 7, wherein the housing comprises an upper housing and a lower plate configured to be fixed to a lower surface of the upper housing and the biasing device is fixed to an upper surface of the upper housing, and wherein the upper housing comprises a pair of recesses at longitudinal end sides, which, when the lower plate is fixed to the upper housing, the recesses function as the slots for receiving the members.

11. The device as claimed in claim 10, wherein the upper housing comprises a set of pin slots provided on the lower surface to accommodate the pivot pins, and wherein the lower plate comprises a set of locating lugs such that, when the lower plate is fixed to the lower surface of the upper housing, the locating lugs are received in the pin slots to retain the pivot pins as well as to locate position of the lower plate relative to the upper housing.

12. The device as claimed in claim 1, wherein the members are a pair of landing gear of a UAV, and the device is fixed to a fuselage of the UAV.

13. A biasing device for biasing a pair of snap levers of a quick release device for coupling a pair of members, the biasing device comprises a planar sheet configured to be placed on an upper face of a housing of the quick release device, the sheet includes a pair of cut-outs that define a pair of cantilevers that function as leaf springs, one for each of the snap levers that are pivotally fixed to the housing for movement between a lock position and a release position, such that the snap levers are in contacted with the leaf springs to bias the snap levers towards the locked position of the snap levers.

14. The biasing device as claimed in claim 13, wherein the cut-outs are generally U-shaped.

15. The biasing device as claimed in claim 13, wherein the biasing device is made from any one or a combination of carbon fibre and carbon steel.

\* \* \* \* \*